United States Patent
Peacock

(10) Patent No.: US 6,494,936 B1
(45) Date of Patent: Dec. 17, 2002

(54) FILTER ASSEMBLIES

(75) Inventor: George Brandwood Peacock, Chichester (GB)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/744,190

(22) PCT Filed: Jul. 23, 1999

(86) PCT No.: PCT/GB99/02407

§ 371 (c)(1),
(2), (4) Date: Mar. 21, 2001

(87) PCT Pub. No.: WO00/04981

PCT Pub. Date: Feb. 3, 2000

(30) Foreign Application Priority Data

Jul. 23, 1998 (GB) .............................................. 9816118

(51) Int. Cl.⁷ ........................... B01D 46/02; B01D 46/52
(52) U.S. Cl. .............................. 95/273; 95/287; 55/498; 55/502; 55/521; 55/528
(58) Field of Search .......................... 95/273, 285, 287; 55/323, 332, 498, 502, 507, 510, 521, 528

(56) References Cited

U.S. PATENT DOCUMENTS

| | | | | |
|---|---|---|---|---|
| 4,213,768 A | * | 7/1980 | Bauman et al. ................ | 95/273 |
| 4,609,465 A | * | 9/1986 | Miller ...................... | 210/323.2 |
| 4,663,041 A | * | 5/1987 | Miyagi et al. ............. | 55/521 X |
| 4,816,328 A | * | 3/1989 | Saville et al. .............. | 55/528 X |
| 5,130,023 A | * | 7/1992 | Feint ........................ | 55/521 X |
| 5,207,812 A | | 5/1993 | Tronto et al. | |
| 5,395,429 A | * | 3/1995 | Sutsko et al. .................. | 95/273 |
| 5,427,597 A | * | 6/1995 | Osendorf .................. | 55/528 X |
| 5,597,645 A | * | 1/1997 | Pike et al. ................ | 55/528 X |
| 5,616,828 A | * | 4/1997 | Kuczenski .................... | 73/38 |
| 5,855,783 A | * | 1/1999 | Shucosky et al. .......... | 55/521 X |
| 5,948,146 A | * | 9/1999 | Thomaides et al. ........... | 95/273 |
| 5,981,614 A | * | 11/1999 | Adiletta ..................... | 95/273 X |
| 6,110,249 A | * | 8/2000 | Medcalf et al. ........... | 55/528 X |
| 6,149,702 A | * | 11/2000 | Kawano et al. ............ | 55/528 X |
| 6,261,979 B1 | * | 7/2001 | Tanaka et al. ............. | 55/521 X |
| 6,302,934 B1 | * | 10/2001 | Nabata et al. ............ | 55/528 X |
| 6,334,881 B1 | * | 1/2002 | Giannetta et al. .......... | 55/528 X |
| 6,336,948 B1 | * | 1/2002 | Inoue et al. ............... | 55/521 X |

FOREIGN PATENT DOCUMENTS

| | | | |
|---|---|---|---|
| EP | 0490662 A1 | * | 6/1992 |
| EP | 0695573 A1 | * | 2/1996 |
| WO | WO 94/22553 | | 10/1994 |

* cited by examiner

*Primary Examiner*—Robert H. Spitzer
(74) *Attorney, Agent, or Firm*—Leydig, Voit & Mayer, Ltd.

(57) ABSTRACT

A filter assembly comprises a housing (44) with an inlet (45) and an outlet (43). A filter module (10) is within the housing (44) and communicates with the inlet (45) and the outlet (43) such that fluid passing to the inlet (45) is filtered by the filter module (10) before passing to the outlet (43). The filter module (10) includes a filter membrane (11) of hollow cylindrical shape having an air throughput of at least 1300 normal cum/hr per 250 mm of the axial length of the membrane at an inlet pressure of 2 barg. Such a filter module (10) can be used in a process system (40) in which the module (10) supplies sterile air and is testable in situ.

15 Claims, 3 Drawing Sheets

FILTER ASSEMBLIES

The invention relates to filter assemblies.

A filter assembly typically comprises a housing having an inlet and an outlet. A filter element is located within the housing and communicates with the inlet and the outlet. Accordingly, fluid entering the inlet is filtered by the filter element before leaving through the outlet. A typical filter element may be of hollow cylindrical shape.

It is a problem that many filter elements currently manufactured have a comparatively small flow capacity. This means that, in many applications, it is necessary to use a significant number of filter elements connected in parallel in order to provide a required flow of fluid. For air filters, this leads to a limitation imposed by the pressure drop through the core. In addition, the use of a large number of small filters requires the use of larger housings with resultant increased cost and space requirements.

According to a first aspect of the invention, there is provided an air filter assembly comprising a housing having an inlet and an outlet and containing at least one filter module, the at least one filter module including a filter element communicating with the inlet and the outlet such that fluid entering the inlet is filtered by the filter element before leaving via the outlet, the filter element including a pleated filter membrane of hollow cylindrical shape having a pack height of 12 mm or less and an air throughput of at least 1300 normal m$^3$/hr per 250 mm of the axial length of the membrane at an inlet pressure of 2 barg.

According to a second aspect of the invention, there is provided a system comprising an air supply, a filter assembly according to the first aspect of the invention and in which the filter membrane is a sterilizing grade filter member with the inlet of the filter assembly connected to said supply and the outlet of the filter assembly connected to processing means which receives sterile air from the filter assembly for use in a process, means being associated with the filter assembly for water intrusion testing the filter membrane in situ.

According to a third aspect of the invention, there is provided a method of supplying sterile air to processing means comprising passing air through a filter assembly according to the first aspect of the invention and in which the filter membrane is a sterilizing grade filter membrane feeding air from the filter assembly to said processing means, and periodically halting the flow of air from said filter assembly and water intrusion testing the filter membrane in situ.

The following is a more detailed description of an embodiment of the invention, by way of example, reference being made to the accompany drawings in which.

Figure 1:
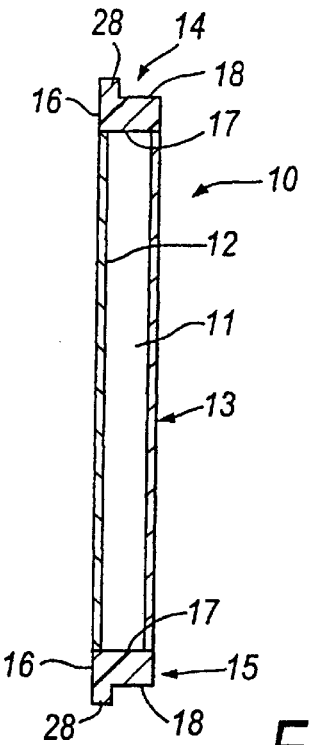
FIG. 1 is a cross section through a filter module.

Referring first to FIG. 1, the filter module 10 is formed by a membrane 11, an outer cage 13 and an inner core 12. The membrane 11 is prior to pleating preferably a sterilizing grade and so is capable of providing sterile air. A sterilizing grade filter membrane is a membrane that will provide air free of microbial contaminants and a measure of this is that, prior to being pleated or otherwise formed, the membrane will hold back 10$^7$ *Brevundimonas diminuta* per square cm.

The membrane 11 is formed of a material such as PTFE. The membrane 11 is pleated and there may, for example; be 0.9 pleats/mm (23 pleats/inch) around the outside of the filter membrane 11 and 1.02 pleats/mm (26 pleats/inch) around the inside of the filter membrane 11. The pack height of the pleated membrane (the thickness of the pleated membrane from the end of a radially inner pleat to the end of a radially outer pleat) is less than 12 mm and preferably 10 mm or less. The pleats may be laid-over pleats.

The membrane 11 has an air throughput of at least 1300 normal m$^3$/hr per 250 mm of the axial length of the membrane at an inlet pressure of 2 barg. In this context, "normal" means that the measurement is made at standard temperature and pressure. The membrane 11 may be provided with layers of a suitable non-woven material (not shown) to serve as support layers.

The ends of the filter pack 11 are connected to respective identical first and second end caps 14,15. The end caps 14,15 are formed from a suitable compatible plastics material and comprise an outer annular portion 16 having spaced first and second radial surfaces 17,18. The first radial surface 17 is welded to the membrane 11, the cage 13 and the core 12. In addition, as seen in FIG. 1, the second radial surface 18 has an upstanding annular rib 28. Thus both ends of the filter module are open.

The filter module may have an outer diameter of at least 76 mm preferably 168 mm, an inside diameter of at least 50 mm preferably 127 mm, and a pack height of less than 12 mm and preferably 10 mm or less. The length of membrane 11 between the end caps 14,15 is at least 250 mm.

Filter modules as described above with reference to FIG. 1 can be used to provide sterile air for various processes, such as fermenting. One such process will be described in more detail below. The removal efficiency of such filter modules can be tested using an aerosol challenge test (as will be described below in more detail) and this efficiency of the filter module can then be related to a measurement made by a water intrusion test (which will also be described in more detail below). Thus a water Intrusion test on a filter module of the kind described with reference to FIG. 1 can determine whether it is likely that the filter has maintained its ability to provide sterile air. As will be described in more detail below, the filter module described above with reference to FIG. 1 can be water intrusion tested in situ, and this is a significant advantage.

Figure 2:
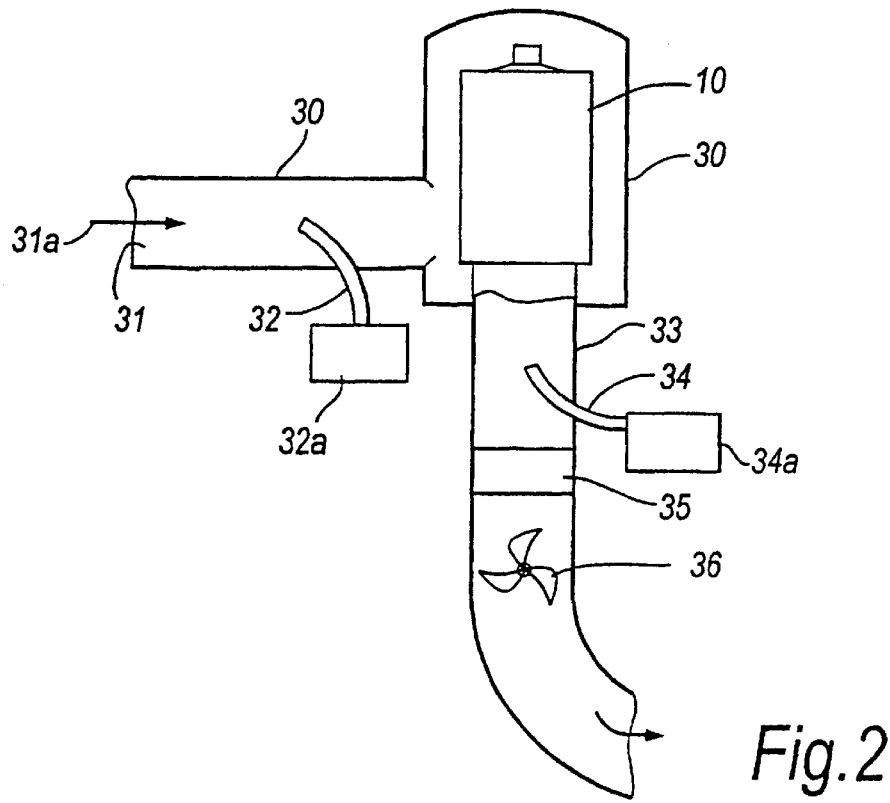
FIG. 2 is a schematic diagram of a challenge rig for performing an aerosol challenge on the filter module of FIG. 1.

The aerosol challenge test is performed by mounting a test filter in a challenge rig as shown in FIG. 2. Referring to that Figure, the rig comprises a stainless steel housing 30 within which the filter module 10 is mounted. The housing 30 has an inlet 31 containing a sampling point 32 and connected to a Collison spray 31a. An outlet 33 to the housing 30 also includes a sampling point 34, a HEPA filter 35 and a fan 36 for drawing air through the rig. The upstream and downstream sampling points 32,34 are connected to respective sterile glass cyclone samplers 32a, 34a.

A challenge test was performed on the filter module 10 using the bacterium *Brevundimonas diminuta* (ATCC 19146) in suspension in distilled water such that when the suspension was nebulized in the Collison spray the water in the droplets evaporated before reaching the filter module 10. The concentration of the challenge suspension was limited so that the majority of droplets generated by the nebulizer would contain single cells. The size of the majority of particles challenging the filter module 10 during this challenge were therefore the actual size of the single cells—*B. diminuta* having a mean diameter of 0.03 µm.

The aerosol challenge was performed at high flow rates (3.2±0.1 m$^3$/min) to simulate the conditions that the filter module 10 would encounter in service. The temperature was 14° C. to 19.5° C. and the relative humidity between 56% and 66%.

Microbial assays were performed on the fluid collected from the sampling points 32,34 and the removal efficiency for the challenge was calculated using the formula $$R_e = \frac{A_I}{A_O} \times 100\%$$

where $R_e$=removal efficiency $A_I$=number of bacteria in inlet assay $A_O$=number of bacteria in outlet assay Four filter modules 10 having PTFE membranes each with an area of 2.2 meter and taken from the same batch of membrane where there are variations in the membrane across the batch, were tested in this way. The results were as follows:

| Filter Module No. | Removal efficiency ($R_e$) |
| --- | --- |
| 1 | >1 × 10$^8$ |
| 2 | >1 × 10$^8$ |
| 3 | >1 × 10$^8$ |
| 4 | 6 × 10$^6$ |

The four filter modules 10 were then integrity tested by the water intrusion test. In this test, filter module 10 was mounted in a housing having an inlet and an outlet. The upstream side of the housing was filled with water which was prevented from passing through the filter module due to the hydrophobicity of the filter membrane 11 and a gas (typically air or nitrogen) was applied to the water. The resulting water flow through the filter module 10 is measured directly on the upstream side using sensitive flow measurement equipment such as that sold by Pall Corporation under the trade marks FLOWSTAR or TRUFLOW. The pressure was applied at 1000 mbar and the flow readings was taken after 10 minutes to ensure steady flow. The results were as follows:

| Filter Module No. | Water Flow (ml/min) |
| --- | --- |
| 1 | 0.4 |
| 2 | 0.8 |
| 3 | 1.8 |
| 4 | 4.9 |

A removal efficiency of >×10$^8$ is sufficient to ensure the supply of sterile air. It will be seen, therefore, that provided the water flow is less than 1.8 ml/min in a water intrusion then, for a filter module 10 of the kind tested, the filter module 10 will supply sterile air. In this regard, it should be noted that the correlation between water intrusion test values and removal efficiency is not determined solely by the structure of the filter membrane. It may be affected by the configuration of the membrane 11 (e.g. whether it is pleated) and the conditions under which it is used. In general, therefore. a conservative water intrusion test flow value will be used to indicate the need to change the filter module 10. For example, in the present case, a value of 1.0 ml/min may be used.

Figure 3:
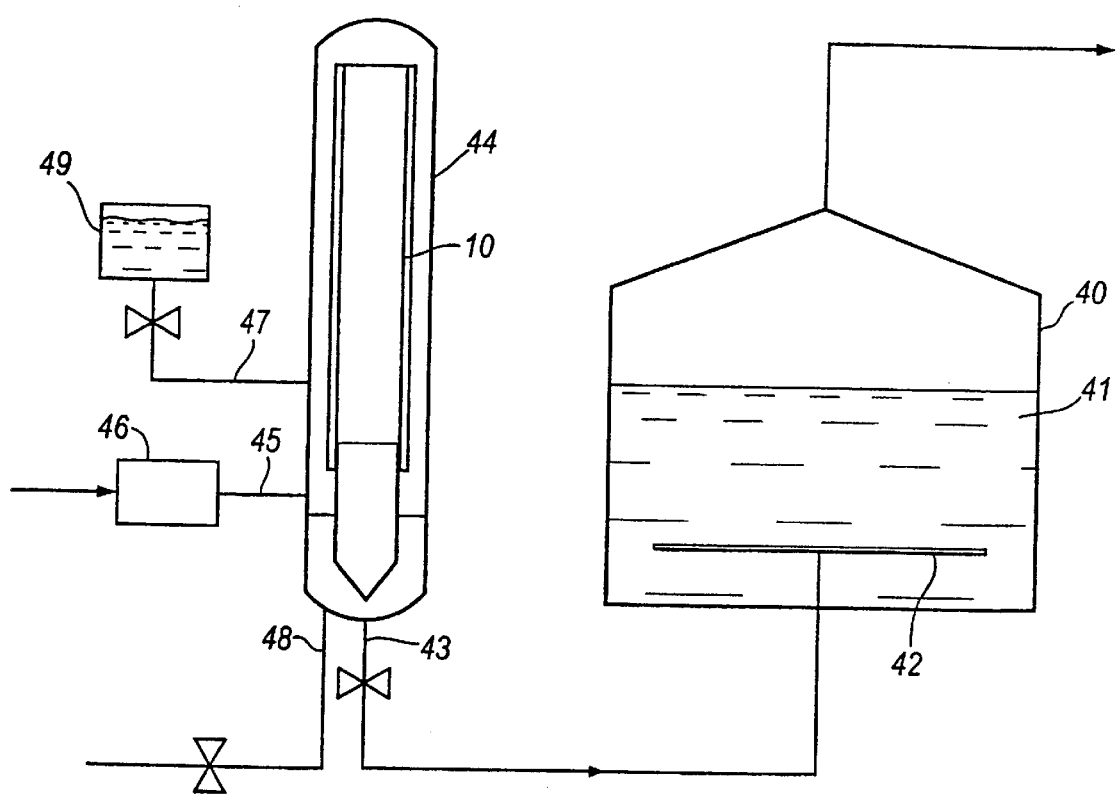
FIG. 3 is a schematic view of a fermenter incorporating the filter of FIG. 1.

An example of a filter module 10 which is able to be water intrusion tested in situ will now be described with reference to FIG. 3. Referring to that Figure, a fermenter comprises a chamber 40 containing a fluid 41 to be fermented. An air distributor 42 is located in the chamber 40 within the fluid 41. The air distributor 42 is connected to the outlet 43 of a housing 44 containing a filter module 10 of the kind described above with reference to the drawings and capable of supplying sterile air. The housing 44 has an inlet 45 connected to a compressor and pressure regulator 46 that supplies air to the filter module 10 at a predetermined pressure. The filter module 10 produces sterile air which passes to the air distributor 42 from which it bubbles through the fluid 41 to aid the fermentation process.

Figure 4:
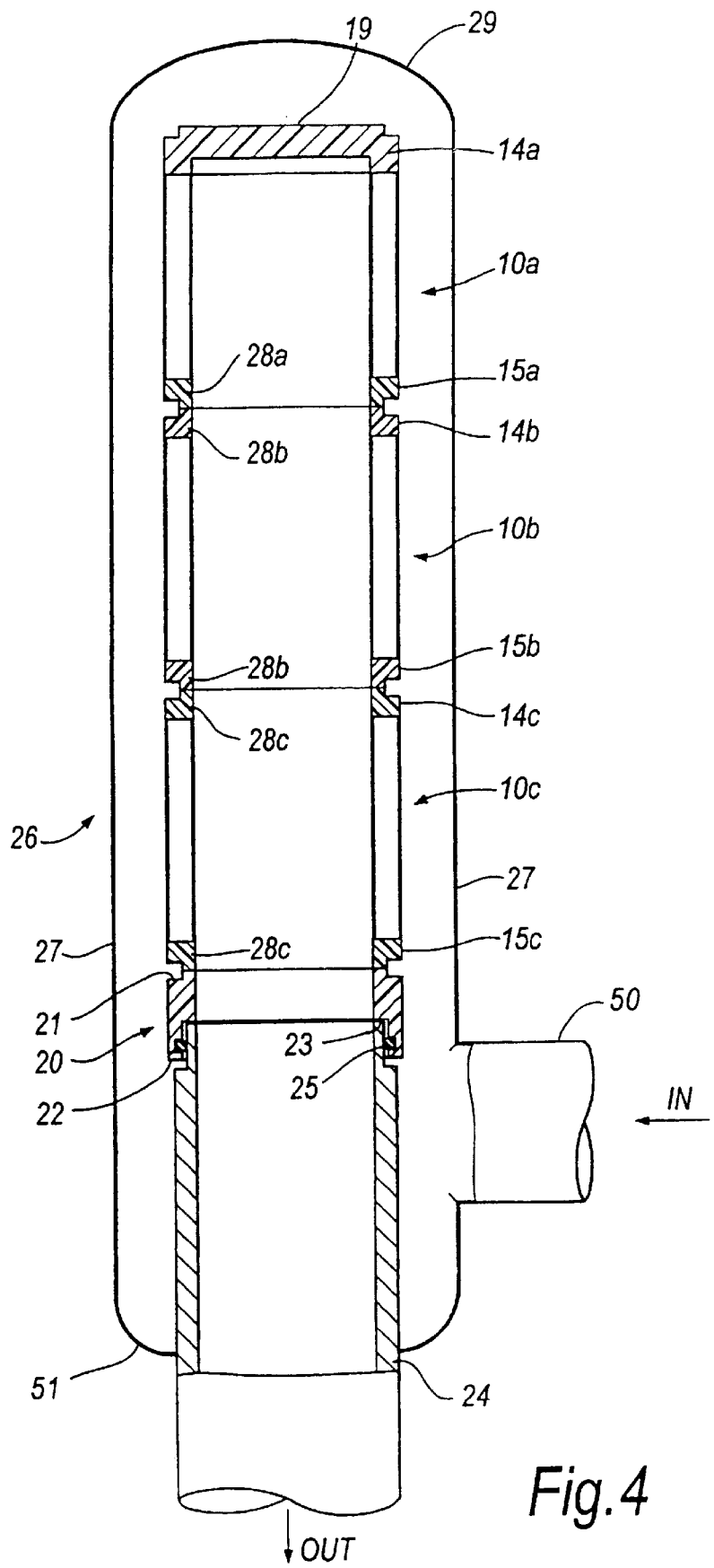
FIG. 4 is a cross section through a filter element formed from three filter modules of the kind shown in FIG. 1 and mounted in a housing.

It is possible to test the filter module 10 in situ using the water intrusion test described above. This is achieved by closing the outlet 43 and opening a vent 48. Water is then fed to the housing 44 from a source 49 via a valve controlled inlet 47. Air is then supplied to the housing 44 by the compressor 46 and the water flow rate is measured as described above. If the water flow rate is less than 1.0 ml/min the filter module is supplying sterile air and does not need to be replaced. If, however, the flow rate is above 1.0 ml/min there is a high statistical chance that the integrity of the filter module 10 may be compromised and the filter module 10 will need to be changed. Referring next to FIG. 4, parts common to FIG. 1 and to FIG. 2 will be given the same reference numerals and will not be described in detail.

In the embodiment of FIG. 4, three filter modules 10a, 10b, 10c of the kind described above with reference to FIG. 1 are connected end-to-end to provide a filter assembly of increased capacity. The first filter module 10a is provided with end caps 14a, 15a as described above. The upper end cap 14a (as viewed in FIG. 2) is closed by a circular blind end member 19. The second filter module 10b has end caps 14b, 15b as described above with the rib 28a of the lower end cap 15a of the first filter pack 10a being welded to the corresponding rib 28b of the adjacent upper end cap 14b of the second filter module 10b. The third filter module 10c is connected to the second filter module 10b via the ribs 28b, 28c in the same way as the second filter module 10b is connected to the first filter module 10a.

The filter assembly formed by the three filter modules 10a, 10b, 10c is mounted in a housing 26. The housing 26 has a generally cylindrical side wall 27 provided with a radially extending inlet 50. One end of the wall 27 is closed by a first end wall 29 and an outlet tube 24 passes through a second end wall 51 closing the other end of the side wall 27. The filter assembly is connected to the outlet tube 24 as follows.

The lower end cap 15c of the third filter module 10c is connected to an adapter 20 formed from a plastics material. The adapter 20 is generally annular with spaced first and second radial surfaces 21,22. The first radial surface 21 is welded to the rib 28c of the lower second end cap 15c on the third filter pack 10c. The interior of the adapter 20 is provided with an annular rebate 23 for receiving the end of the outlet tube 24. The rebate 23 is provided with an annular seal 25 preventing leakage between the adapter 20 and the outlet tube 24.

The dimensions of the filter modules 10a, 10b, 10c may be as given above. The throughput of the filter assembly is at least 4000 normal cum/hr at an inlet pressure of 2 barg.

It will be appreciated that there may be more or less modules 10a, 10b, 10c. Larger installations for higher throughputs can be obtained by manifolding together a number of housings of the kinds described above with reference to the drawings.

The filter assembly of FIG. 4 can be tested in situ by the water intrusion test as described above. In addition, this assembly can be used in a fermenter as described above with reference to FIG. 3.

What is claimed is:

1. An air filter assembly comprising a housing having an inlet and an outlet and containing at least one filter module, the at least one filter module including a filter element communicating with the inlet and the outlet such that fluid entering the inlet is filtered by the filter element before leaving via the outlet, the filter element including a pleated filter membrane of hollow cylindrical shape having a pack height of 12 mm or less and an air throughput of at least 1300 normal m$^3$/hr per 250 mm of the axial length of the membrane at an inlet pressure of 2 barg.

2. An air filter according to claim 1 wherein the filter membrane is sterilizing grade filter membrane.

3. A filter assembly according to claim 1 wherein the filter element has an outside diameter of at least 76 mm.

4. A filter assembly according to claim 1 wherein the filter membrane comprises a membrane of PTFE.

5. A filter assembly according to claim 1 wherein the filter element includes an outer cage and an inner core with the filter membrane therebetween.

6. A filter assembly according to claim 1 wherein the filter element comprises a plurality of filter modules, each module including a membrane and the modules being connected end-to-end to form a composite hollow cylindrical filter.

7. A filter assembly according to claim 6 wherein each filter module has first and second ends, each end having a respective end cap, an end cap of each module being connected to an end cap of the next successive end cap to provide a first connection so that the modules are connected end-to-end.

8. A filter assembly according to claim 7 wherein the end caps are of plastics material and the first connection is a heat welded connection.

9. A filter assembly according to claim 7 wherein the housing outlet includes an outlet tube, an end cap of a filter module of said plurality of filter modules being connected to said outlet tube by a second connection to provide a fluid communication between said modules and said outlet tube.

10. A filter assembly according to claim 9 wherein an adapter ring is connected between the outlet tube and an end cap of the module adjacent the outlet tube to provide the second connection and fluid communication.

11. A system comprising:

a filter assembly according to claim 2, an air supply, a processing means, and a means for water intrusion testing, wherein the inlet of the filter assembly is connected to said supply and the outlet of the filter assembly is connected to the processing means, the processing means receiving sterile air from the filter assembly for use in a process, and wherein the means for water intrusion testing is associated with the filter assembly for water intrusion testing the filter membrane in situ.

12. A system according to claim 11 wherein the water intrusion testing means include a supply of water to be fed to the inlet filter assembly and means for pressurizing the inlet of the filter assembly with a gas and for measuring the rate of water flow through the membrane at a predetermined gas pressure.

13. A system according to claim 11 wherein the processing means is a fermenter.

14. A system according to claim 13 wherein the fermenter is a pressurized fermenter.

15. A method of supplying sterile air to processing means comprising passing air through a filter assembly according to claim 2, feeding air from the filter assembly to said processing means, and periodically halting the flow of air from said filter assembly and water intrusion testing the filter membrane in situ.

* * * * *